Patented Nov. 18, 1930

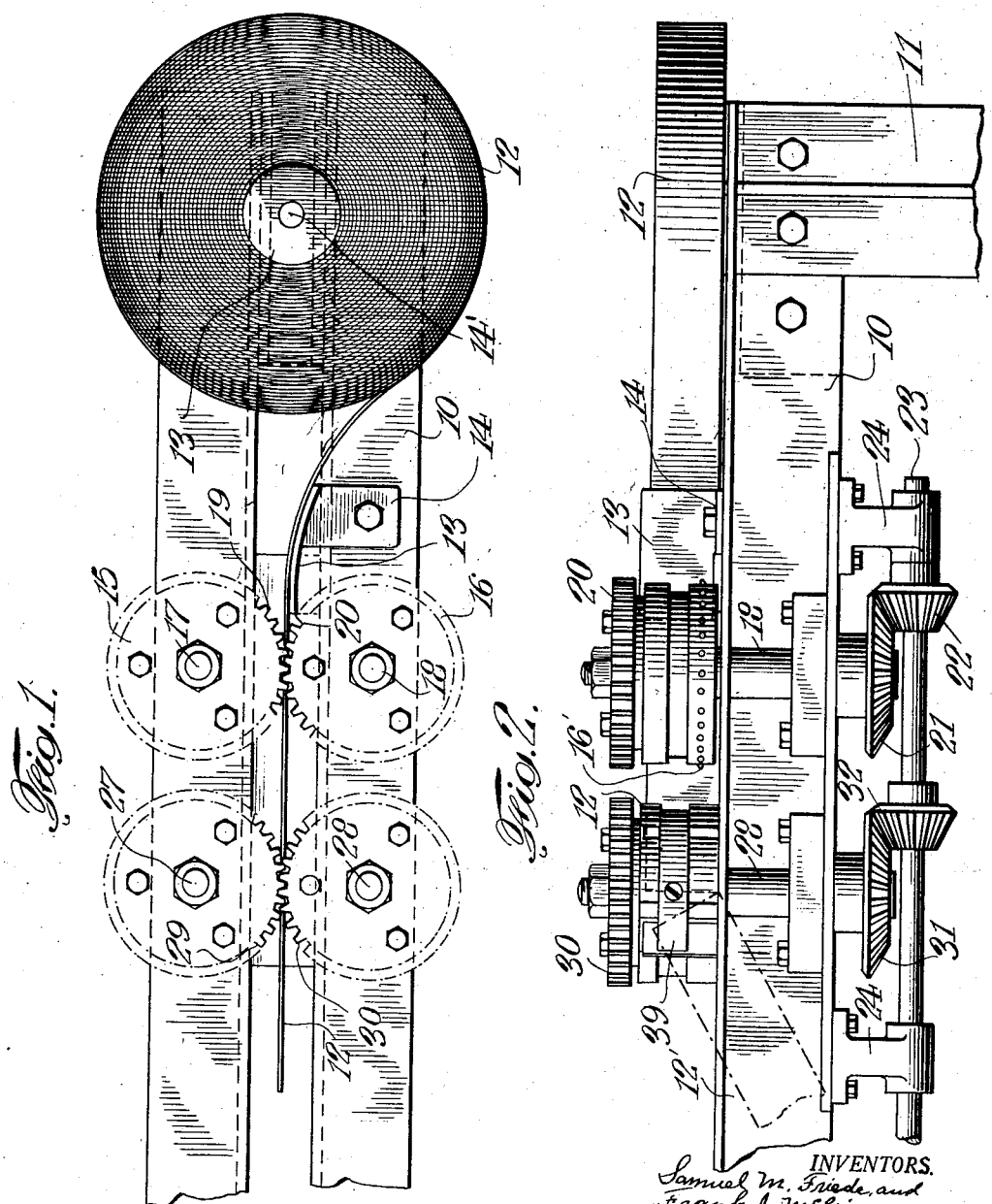

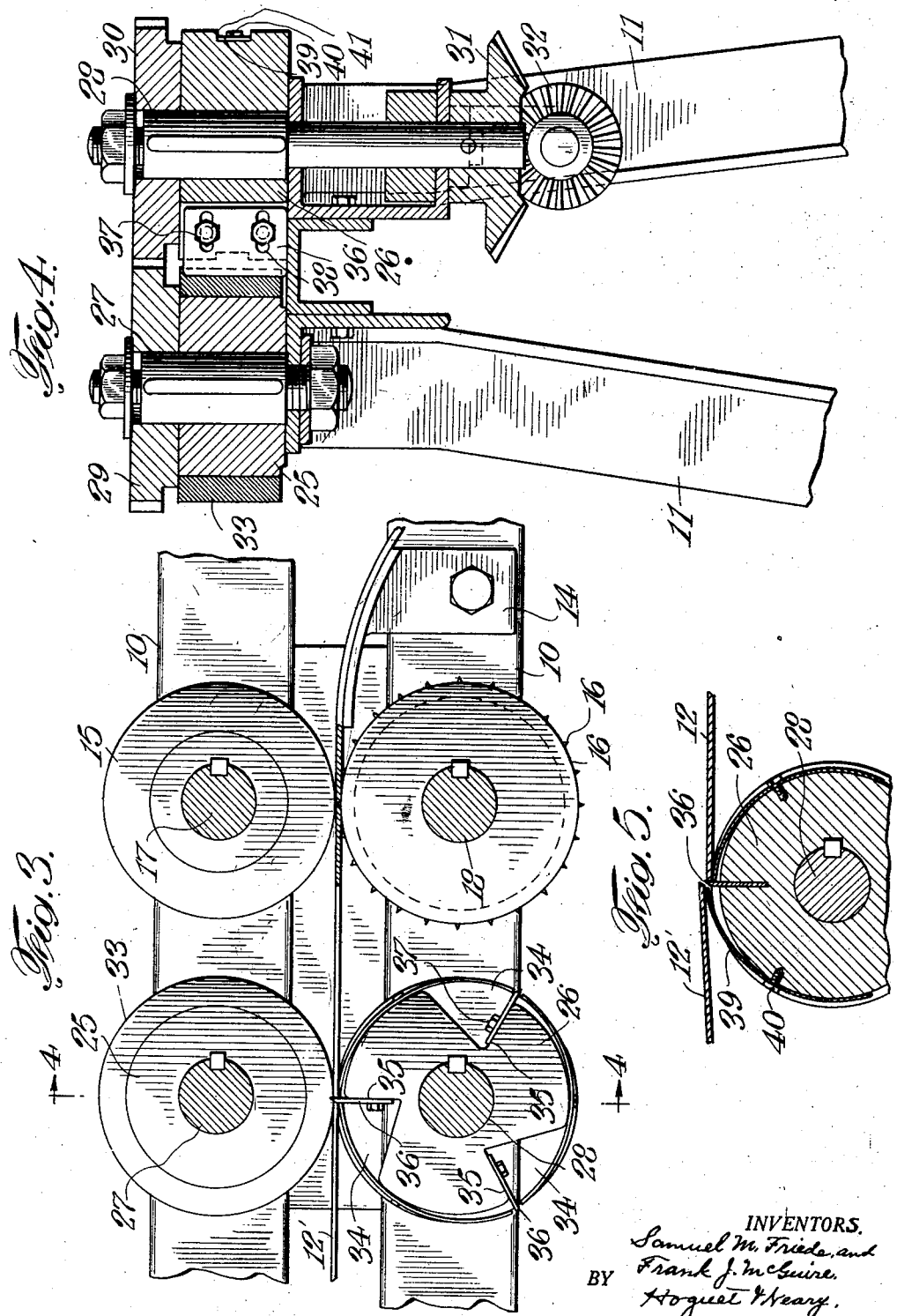

1,781,900

UNITED STATES PATENT OFFICE

SAMUEL M. FRIEDE AND FRANK J. McGUIRE, OF SARASOTA, FLORIDA

MATCH-STOCK-CUTTING APPARATUS

Application filed May 19, 1928. Serial No. 278,973.

Our invention relates to improvements in a machine for cutting cards from sheet match stock preparatory to having the cards made into matches. Our invention also comprises a step in the art of preparing such stock which affords an economy in the preparation of the stock. So far as the machine is concerned, the object of our invention is to produce a simple and efficient machine which will rapidly cut long strips of stock into cards of a desired length. These cards are subsequently made into matches and headed in conventional or preferred ways. The invention will be better understood from the following description.

Reference is to be had to the accompanying drawings forming a part of this specification, in which similar reference characters indicate corresponding parts in all the views.

Figure 1 is a plan view of the machine embodying our invention.

Figure 2 is a side elevation.

Figure 3 is a broken sectional plan of the machine.

Figure 4 is a cross section on the line 4—4 of Figure 3, and

Figure 5 is a broken sectional detail of the knife carrying roller of the cutter.

The machine is provided with a suitable frame comprising in the present instance a bed 10 and supporting legs 11. The bed is shown broken, as in practice it also forms a support for mechanism to perform other work on the stock.

The sheet stock 12 is usually a wood veneer but it can be any sheet stock, and it is as stated of the thickness of a match, while its width corresponds to the length of a match. In practice the veneer generally comes in the form of a roll 12 which is the way it is rolled up after being turned on a veneer lathe, and the roll is mounted on a spool 13 which lies horizontally on the spindle 14'. The roll of veneer is impregnated to prevent coaling in any approved way before it is cut, and while the stock is usually in the form of a roll, it may be in long lengths, and in practice there are sure to be many long lengths of stock which have been broken off or which for some reason cannot be conveniently rolled.

The stock is continuously fed between these rollers and a cutter, and before it enters the rollers it passes over the curved vertically arranged guide 13 which can be provided with a flange 14 to facilitate its attachment to the frame 10. The stock after passing the guide is threaded between the continuously rotating feed rollers 15 and 16, and the roller 15 can be of soft metal, rubber, rawhide, or any suitable material, while the roller 16 is provided with teeth 16' which engage the stock and urge it forward. The feed rollers 15 and 16 are mounted on and fastened to shafts 17 and 18 which are vertically arranged and suitably supported in the bed 10, and they are geared together in the conventional way by gears 19 and 20. One of the shafts, in the present instance the shaft 18, is prolonged and provided with a bevel gear 21 which engages and is driven by a gear 22 on the shaft 23 which runs parallel with the bed, and is supported in hangers 24. Obviously the rollers might be differently driven, but in practice this shaft 23 extends along the machine and serves to drive the rollers of the machine here described, and also other parts which are not here referred to.

After the stock leaves the feed rollers 15 and 16 it enters the rotary cutter comprising opposed rollers 25 and 26 which are secured to vertical shafts 27 and 28, geared together as shown at 29 and 30. The shaft 28 is connected with and driven by the shaft 23 through the medium of the meshing bevel gears 31 and 32.

The roller 25 has a soft surface 33 which can be rubber, rawhide, soft metal, or any suitable material, because the cut-off knives 36 impinge upon it and the face portion 33 of the roller should not therefore be too hard. The rollers 25 and 26 turn at the same rate as the feed rollers 15 and 16.

The cut off roller 26 is recessed at intervals as shown at 34, which provides shoulders 35 to which the radial blades or knives 36 are attached. These are secured by bolts 37 extending through slots 38 (see Figure 4) so that the knives 36 can be conveniently adjusted. There can be any desired number of these knives and corresponding recesses and shoulders, depending on the length of the cards to be cut, and also on the size of the roller 26, the blades projecting far enough from the face of the roller 26 to sever the stock 12 and cut it off into cards 12′ as it passes between the rollers. This will be seen by reference to Figure 3.

Adjacent each blade or knife 36 is a stripping spring 39 which lies preferably in a groove 41 in the face of the roller 26 and is secured by a bolt 40. The free end of the spring, as shown in Figure 5, extends into close proximity to the adjacent blade 36, and the tension of the spring is outward so that when a card 12′ is cut off by the blade as in Figure 5, the spring 39 will first be depressed and will then spring outward to expel the end of the card so that the latter shall not stick.

Thus it will be seen that we show a very simple machine which has a continuous feed and continuous cut-off, and which can be very readily made to cut the stock into cards of a desired length.

We claim:—

1. In a machine of the kind described, a rotary cutter comprising opposed rollers, one serving as a bearer for the stock and the cut off knives, and the other having spaced peripheral knives, a circumferential groove for each knife and a stripper spring in each groove extending circumferentially, said spring located between the knives and fixed at its middle portion.

2. In a machine of the kind described a rotary cutter comprising a pair of opposed rollers, one having spaced peripheral knives and an arcuate stripper spring for each knife extending circumferentially on said roller, said spring being fixed to the roller for a portion of its length with its free end lying near the knife and tensioned to spring outwardly.

3. In a machine of the kind described a rotary cutter comprising a pair of opposed rollers, one having spaced circumferential recesses therein, and a knife secured to a wall of each recess and extending outwardly beyond the face of the roller and an arcuate stripper spring behind each knife, said spring being secured to the roller for a portion of its length and having its free end extending across the recesses to a point near the knife and tensioned to spring outwardly.

4. In a machine of the kind described a rotary cutter comprising a pair of opposed rollers, one having spaced circumferential recesses therein, and a knife secured in each recess and projecting from the face of the roller and circumferential grooves on the face of the roller merging in the said recesses and an arcuate stripper spring secured for a portion of its length in each groove and extending across the recess to a point near the knife with the free end tensioned to spring outwardly.

In testimony whereof, we have signed our names to this specification this 15th day of May, 1928.

SAMUEL M. FRIEDE.
FRANK J. McGUIRE.